United States Patent [19]

Abadi et al.

[11] Patent Number: 5,940,619
[45] Date of Patent: Aug. 17, 1999

[54] DYNAMIC FINE-GRAINED DEPENDENCY ANALYSIS FOR A FUNCTIONAL LANGUAGE

[75] Inventors: Martin Abadi; James J. Horning, both of Palo Alto, Calif.; Butler W. Lampson, Cambridge, Mass.; Roy Levin, Palo Alto, Calif.; Jean-Jacques Levy, Paris, France; Yuan Yu, Santa Clara, Calif.

[73] Assignee: Digital Equipment Corporation, Maynard, Mass.

[21] Appl. No.: 08/738,150

[22] Filed: Oct. 25, 1996

[51] Int. Cl.⁶ ..................................... G06F 9/45
[52] U.S. Cl. ............................................ 395/705
[58] Field of Search .................... 395/703, 705, 395/707, 709

[56] References Cited

U.S. PATENT DOCUMENTS 5,500,881   3/1996   Levin et al. ........................... 395/703

OTHER PUBLICATIONS

"The Vesta Language for Configuration Management," by Christine B. Hanna and Roy Levin, Jun. 14, 1993, Digital Equipment Corp., Systems Research Center, Palo Alto, California.

"The Vesta Approach to Precise Configuration of Large Software Systems," by Roy Levin and Paul R. McJones, Jun. 14, 1993, Digital Equipment Corp., Systems Research Center, Palo Alto, California.

Abadi, et al., "Analysis and Caching of Dependencies," ACM SIGPLAN Notices, vol. 31, No. 6, pp. 83–91, Jun. 1996.

Hanna, et al., "The Vesta Language for Configuration Management," Digital Equipment Corp., Systems Research Center, Palo Alto, CA, Jun. 1993.

*Primary Examiner*—Tariq R. Hafiz
*Assistant Examiner*—Peter J. Corcoran, III
*Attorney, Agent, or Firm*—Cesari and McKenna, LLP

[57] ABSTRACT

In a computerized method, a computer program is analyzed while the program is interpreted. The program is expressed in a first memory as input values and functions. Some of the input values are complex values which can have a plurality of component values. Each function operates on combinations of the input values and the functions of the program. The program is interpreted in a processor connected to the first memory. The processor is also connected to a second memory to store result values produced during the interpretation. Selected input values, components of the complex values, and functions are named only if the selected values, components, and functions are necessary to produce a selected result value. For each function of the program, the function which is interpreted, the input values on which the function depends, and the result value produced by the function during interpretation, are recorded in the second memory to dynamically perform a precise dependency analysis of the program.

10 Claims, 11 Drawing Sheets

| EXPRESSION | DEPENDENCIES | RESULT |
|---|---|---|
| if x equals 0 then y+1 else z.r | x=2<br>z.r=4 | 4 |
| if x equals 0 then y+1 else z.r | x=0<br>y=7 | 8 |
| ... | ... | ... |

FIG. 1

| EXPRESSION | DEPENDENCIES | RESULT |
|---|---|---|
| if x equals 0 then y+1 else z.r | x is non_zero<br>z.r=4 | 4 |

| EXPRESSION | DEPENDENCIES | RESULT |
|---|---|---|
| if x equals 0 then * else z.r | x is non_zero<br>z.r=4 | 4 |

FIG. 4

| EXPRESSION | DEPENDENCIES | RESULT |
|---|---|---|
| if x equals 0 then * else z.r | x is non_zero<br>z=[r=4, s=*] | 4 |

FIG. 5

| EXPRESSION | DEPENDENCIES | RESULT |
|---|---|---|
| 8106332 | x = 904728<br>z.r = 2177709 | 4 |
| 8106332 | x = 3241556<br>y = 629943 | 8 |

DYNAMIC FINE-GRAINED DEPENDENCY ANALYSIS FOR A FUNCTIONAL LANGUAGE

FIELD OF THE INVENTION

This invention relates to computer systems, and more particularly to caching input and output data processed by computer systems.

BACKGROUND OF THE INVENTION

In a very general sense, computer implemented processes do nothing more than process input data to produce output data. For example, input data I supplied to a process P produces output data O. In many cases, the same, or almost the same input data are repeatedly processed by the same process. In this case, information about the input data and the process, as well as the output data, can be cached. Then, if the same input data are subsequently recognized, the output data can directly be produced from the cache. This makes sense if the cost of processing the data is large when compared with the cost of caching the data.

For example, a complex software system is typically generated from input data in the form of a large number of source code objects, configuration options, and building instructions. Each source code object may include, perhaps, thousands of lines of source code. Periodically, the source code objects are compiled to generate as output data, object code objects. The object code objects are then linked to generate the machine executable image of the software system. This process is called a system "build." If the system is undergoing active development, a new version of the system may need to be built on a daily, or more frequent basis. Building systems can be time consuming, particularly if the system is generated from many source code objects. Therefore, caching input and output data can reduce the amount of time required to build the system.

In one prior art technique known as memoisation, an operation such as a function application stores all arguments to which a function is applied, together with the results which are obtained. Then, if the function is ever applied again with the same arguments, the result does not need to be recomputed, since the previously cached results can immediately be used. Memoisation is an optimization which can replace a potentially expensive computation by a simple look-up. Since there is no analysis of which specific arguments are used to compute the result, memoisation caches all arguments.

Another prior art scheme analyzes program data dependencies to determine if a result is due to processing a specific set of input data. In this case, only those arguments which contribute to the result are cached. With dependency analysis, the amount of data that need to be cached can be reduced, while increasing the cache hit rate. This is particularly true if the input data are complex.

Most prior art dependency analyses are static and imprecise. Static means that data dependencies of a program are examined prior to executing or interpreting the program. For many data items such as variable arguments or parameters, exact values bound to the arguments are not known until "run" time. Thus, static dependency analysis only allows the recording of imprecise or coarse data dependency information.

If less than the optimal amount of data is cached, then the cache miss rate is increased. Therefore, it is desired to provide a dynamic fine-grained dependency analysis so that the caching of data can be improved. In other words, fine-grained dependency analysis determines, for a particular process, which precise parts of input I are essential to produce output O.

SUMMARY OF THE INVENTION

The time required to build a large software system can be reduced by the present invention which performs a dynamic fine-grained dependency analysis during the interpretation of the programs that build the system. A program or a collection of programs, e.g., a program for building a software system, can be defined in a functional language. During a build of the system, the programs are interpreted. Interpretation includes the evaluation of expressions, and the production of result data. Result data produced from long-to-compute expressions are cached to reduce processing costs.

Expressions can include complex composite data structures, such as records, having many component parts such as source code objects. Prior to interpreting a specific expression of a function, the parts of the expression are examined to see if they have been previously processed. If they have, then the result is retrieved from a cache, and the time which would have been spent re-evaluating the expression is saved.

According to the invention, precise sub-expression parts are identified by names so that they may be subsequently recognized. In one aspect of the invention, the names are labels associated with the parts. In another aspect, the access paths to the parts are identified, so that a subsequent access via a previously identified path can be recognized.

Precisely recording names of values on which an expression depends, and producing cache entries that only store named values has distinct advantages: the number of cache entries is decreased, the size of the cache entries is decreased, and the hit rate in the cache is increased.

Other and further aspects of the present invention will become apparent during the course of the following description and by reference to the accompanying drawings.

BRIEF DESCRIPTION OF THE DRAWINGS

FIG. 1 is a block diagram of cache entries used by the dynamic dependency analysis according to the invention;

FIG. 3 is a block diagram of a cache entry with a fine-grained dependency;

FIG. 4 is a block diagram of a cache entry with a panttern symbol in a sub-expression field;

FIG. 5 is a block diagram of a cache entry with a pattern symbol in a dependency field;

FIG. 6 is a block diagram of a cache entry having fingerprints;

DETAILED DESCRIPTION OF A PREFERRED EMBODIMENT

Introduction

Figure 2:
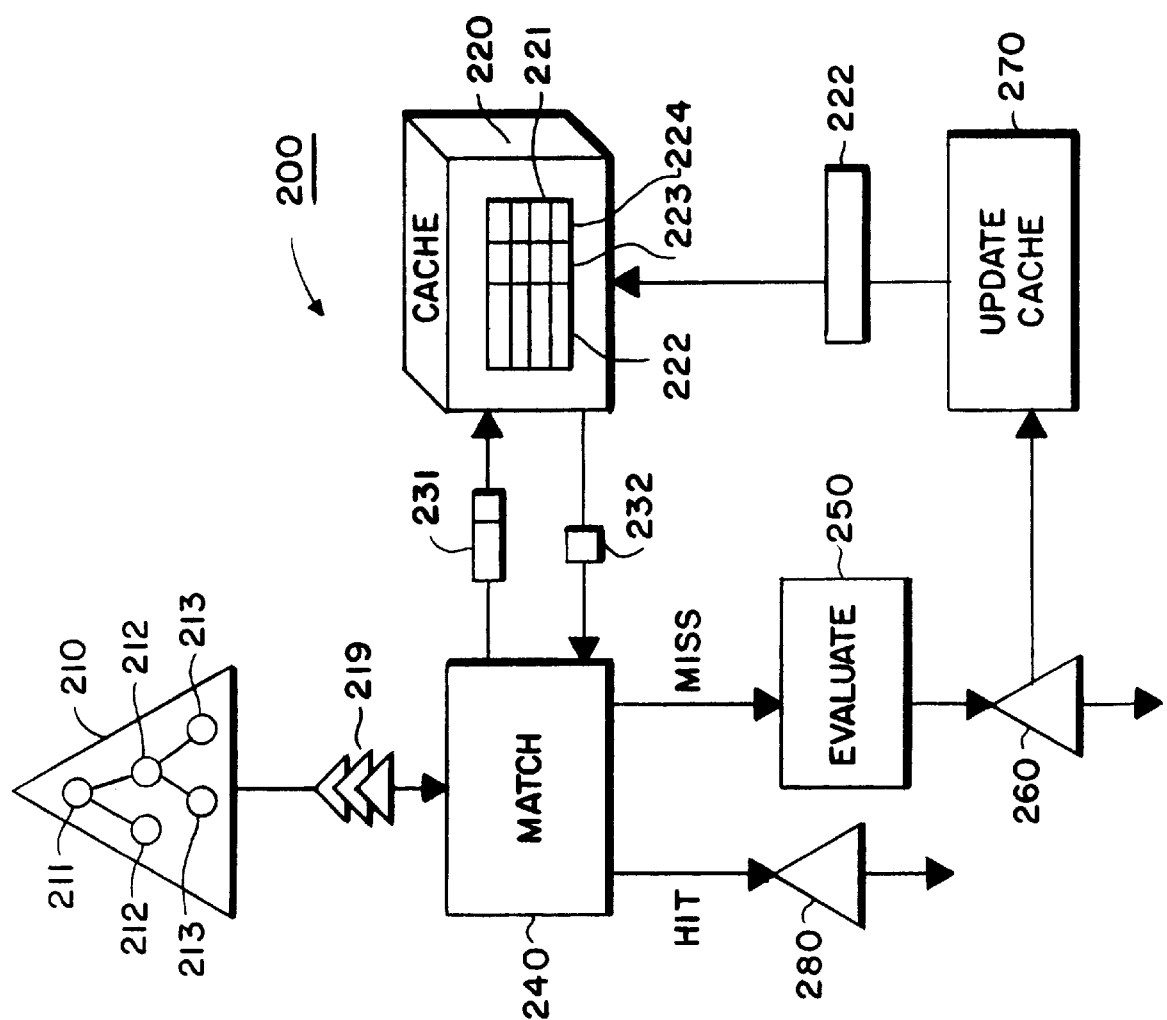
FIG. 2 is a flow diagram of fine-grained dependency analysis.

In a configuration management system, a model can be used to determine how a large-scale software system is generated. The model can be in the form of a program that expresses how the resulting system should be obtained from source objects and options. Every component and instruction used to produce the software system, such as source objects, compilations, and build "options" are described in the model. During a build, the program/model can be evaluated by an interpreter to produce a file containing an object code representation of the software system. As described below, the program/model can be expressed in a functional language, and therefore, the interpretation benefits from caching and fine-grained dependency analysis of the functional language.

Functional Language

A functional language, such as Vesta, can be used to describe the model for generating the software system. Vesta is described in U.S. Pat. No. 5,500,881, Language Scoping For Modular, Flexible Concise, Configuration System, issued to Levin et al. on Mar. 19, 1996, incorporated by reference herein. The Vesta functional language is essentially an untyped lambda calculus, as described in Structure and Interpretation of Computer Programs by Abelson, et al., The MIT Press, 1985, with a small number of additional features. Also, please see, The Lambda Calculus, Its Syntax and Semantics, H. P. Barendregt, Elsevier, 1985.

Building Software Systems

In Vesta, an operation like "compile" is represented in the language as a function. The input data for the function can be source code objects, and the options to be used during compilation. The invocation of the compile function produces as output, the object-code object, or perhaps a file. The software system is built by a series of function applications.

Configuration management is a good domain for functional languages since the absence of side effects produces consistently predictable results. It would be quite complicated to cache results if the language used to describe the model permitted side effects, because in this case the application of one function can potentially invalidate the result of another function application. In a functional language, this cannot happen.

Using a functional language also simplifies the interpreter. A software system is compiled and linked whenever the model is interpreted. If the interpreter had to evaluate every component each time the software system was generated, then an excessive amount of time would be required. The building of software systems can be accelerated when results of expensive evaluation are cached. Results that are cached can quickly be retrieved as needed.

Functions and Values

In the purest form, a program written in a functional programming language theoretically includes only definitions and applications of functions. A functional language intended for practical purposes can also include facilities for binding names to values within selected portions (scopes) of a program, and means for aggregating fields or primitive values, e.g., integers and text strings, into composite values.

Functions

A function is a first class value. In a high-order functional language a function can receive another function as an input argument. In this case, the dependency behavior of the functions are related.

Records

Some values used by a functional language can be composite values having one or more components. For example, a data record can include a plurality of fields.

According to the invention, functions can be applied more efficiently when it becomes possible to determine which component values of a composite value do not contribute to a result value when the function is applied.

Composite Values

Composite values can be a binding, a list, or a record. A binding is a set of "name=value" pairs. A list is a sequence of values, a list may be empty. For example, the list can be implemented as sequence of nodes. Each node includes at least two fields, a data field and a pointer field. The pointer field includes an address of a next element of the list. A record is a concatenation of one or more fields.

As described in greater detail below, it is an advantage to precisely determine which parts of a composite value do not contribute to a result. In this case, a cache "hit" is possible even if a later value is different than the value stored in the cache entry.

Closure

A closure is a function and a current context. This means that the collection of names, values, and parameters defined in the scope of the function, e.g., lists and records, as well as the expression that forms the function body, make up a "closure." Closures can be the input and output data of other functions.

Function Application

A function application can be defined by an expression in the grammar of the language, and the collection of parameters (input data) it accepts. For example, the invocation of a function $f$ on a parameter a is denoted as $f(a)$. The output or result of a function application is determined by the expression that is the body of the function, and by the input parameters. Names can be grouped into two mutually exclusive classes: names of parameters of the function which are not known until the function is invoked; and those names defined in the scope of the function.

The collection of names, values, parameters, and the expression that forms the function body make up a "closure." For example, a program A, $$\text{let } z = 5$$
$$f(x, y) = x + y * z$$
$$\text{in } f(2, 3)$$

defines a closure, binds the closure to the function named "$f$," and applies the function $f$ with two actual input values 2 and 3. In other words, the closure is the triple:

<(x, y), {z=5}, x+y*z>, where the first element of the triple names the parameters, i.e., x and y, the second element lists the one name (z) defined in the scope, and its value, and the last element is the expression forming the function body. Thus, applying the function $f$ produces as an output result value 17.

In a more complex program B, $$\text{let } z = 5$$
$$f(x, y) = \text{if } x \text{ equals } 0 \text{ then } y \text{ else } z$$
$$\text{in } f(2, 3)$$

the result conditionally depends on the expression that is the body of the function, as well as the values bound to z and the parameter x. The value of y is irrelevant to the result of invoking the function whenever the value of the parameter x is non-zero. This example shows that the output of a function may not always depend on all of the input on which the function is applied, even though all of the input parameters are named in the function body. The same can be said about names bound in the scope of the definition of the function. For example, in the program C, let $z = 5$ $f(x, y) = $ if $x$ equals 0 then $y + 1$ else $z$ in $f(0, 3)$ the result of applying the function depends on the values bound to x and y, but not on the value bound to z.

Likewise, in the case of a composite value, such as a record or list, the value of an expression may depend only on a part of the record. For example, in a program D having a record z with two fields, let $z = [r = 4, s = 8]$ $f(x, y) = $ if $x$ equals 0 then $y + 1$ else $z.r$ in $f(2, 3)$ the result of applying the function only depends on the value of x, and the value of the r field of the z record. Therefore, a program E let $z = [r = 4, s = -4]$ $f(x, y) = $ if $x$ equals 0 then $y + 1$ else $z.r$ in $f(2, 9)$ will yield the identical result.

Dependency Analysis

In order to determine the names and values which are used by an expression, a dependency analysis can be performed. Furthermore, as will be described in greater detail below, in a fine-grained dependency analysis, exact dependencies on component parts of composite values can be identified. Generally, fine-grained dependency analysis may reveal that some part of a result depends on some part of the input. Moreover, the analysis may reveal that the entire result depends on some part of the input.

Static and Dynamic Dependency Analysis

Dependency analysis can be performed statically. In this case, an expression under consideration is analyzed before the evaluation takes place. However, during a static analysis not all run-time dependencies may be known. If the analysis takes place dynamically, that is during the steps of the evaluation of the expression, then the characterization of the dependencies can be more precise.

For example, a static analysis of the program E, that is, an analysis which only examines the body of the function, would determine that the dependencies are x, y, and the field z.r. However, an analysis at the time that the function $f(2, 3)$ is applied, will discover the more precise dependencies x and z.r since this dynamically takes into consideration the actual values bound to x and y at the instant of function application. In contrast, static analysis may not have discovered that the parameter y is not used.

Dynamic fine-grained dependency analysis of a program written in a functional language enables a more effective use of the cache during interpretation of the program.

Cache Entries

FIG. 1 shows entries of a cache 100 resulting from a dependency analysis according to one embodiment. In FIG. 1, the rows 101–102 of the cache 100 represent separate cache entries. For each entry, the first column 111 stores the expression. The second column 112 stores a set of names and their associated values. The names can identify parts of composite data value, for example, fields of records. These are the dependencies. The third column 113 stores the value of the expression stored in the first column 111 for the particular name-to-value association as indicated in the second column 112.

Parse Tree

FIG. 2 is an overview of a process 200 which performs dynamic fine-grained dependency analysis. Input data are represented for interpretation as a tree 210. The tree 210 corresponds to the parse tree of the program being interpreted, and includes the input data of the program. The tree 210 includes a root node 211, interior nodes 212, and bottom level leaf nodes 213. The tree 210 can be partitioned into sub-trees, each sub-tree having root, interior, and leaf nodes. A sub-tree can be a single node. for example a function $f$.

Names

A node of the tree 210 can be uniquely identified with a name. For example the name can be a label in the form of a character string which uniquely identifies the node. For example, one of the nodes 213 represents a function $f$ with a label e, which can be noted as e:$f$. Alternatively, the nodes can be uniquely identified by an access path, e.g., tree edges, that needs to be followed to locate the node in the tree.

The Cache

A cache 220 is configured to provide storage of data. The cache 220 can be in the form of a disk storage device. If the amount of information to be cached is small, then the information can be cached in the main memory, e.g., a dynamic random access memory (DRAM). The cache 220 can include a plurality of entries 221 as described above. Each entry 221 includes an expression 222, one or more dependencies 223, and a result 224. The expression 222 and the dependencies 223, together, form an input pattern 231. The result 223 forms an output pattern 232.

Evaluation

Portions 219 representing expressions are presented to the interpreter for evaluation. During evaluation, the input pattern 231 of a next expression is matched by a process 240 against entries 221 stored in the cache 220. There may be zero, one, or multiple matching entries. If there are none, e.g., a cache miss, proceed with process 250, and evaluate the next expression to produce a result 260. The result 260 can also be in the form of a tree. Process 270 takes the input 219 and the result 260 to generate a new entry 222 which is stored in the cache 220.

Matching Cache Entries

For any entries which were matched by process 240, determine if any dependencies 223 match the current state of the interpreter. That is, determine if the dependency values stored in the matching cache entry are identical to the values currently defined for the names. If they are, there is a cache hit, and the associated output pattern 232 can be used to form a result 280 without having to evaluate the expression.

Predicates

As stated above, the dependencies 223 are stored in the cache 220 as pairs, the names and the values bound to names. However, the result value of the expression may not specifically depend on the value bound to the names, but perhaps some weaker property. For example in FIG. 1, the dependency of x in entry 101 is actually a dependency on the value of x being either zero, or non-zero. Therefore, as shown in FIG. 3, a more precise cache entry 300 might indicate a result of 4 whenever the value of x is any non-zero value.

Therefore more generally, the dependencies 223 stored in the second column of the cache entries 221 generally are "predicates" involving names that appear in the expression. The two types of predicates shown in FIGS. 1 and 3 are equality and non-zero. However, other types of predicates are also possible, depending on the properties associated with naming conventions of any particular programming language. For example, predicates may be:

x is an integer;

x is 4 bytes; and x is defined in the current scope.

The number of possible predicates that can be stored in the cache 100 depends on the particular semantics of the language used to write the program, and the methods used to interpret the program.

Pattern Matching

As shown in FIG. 4, the frequency of cache hits can be improved by using a pattern matching technique for names in expressions. As stated above, the value for the expression "if x equals 0 then y+1 else z.r" depends on x and z.r, but not y. Therefore, in a more precise cache entry 400 for this expression, the sub-expression y has been replaced by a "wildcard" or pattern symbol "*" 410. Now during a cache look-up, any sub-expression appearing at the place of the pattern symbol 410 will match. For example, any of the following expressions will match the expression stored in entry 400:

if x equals 0 then else z.r;

if x equals 0 then 9 else z.r; and if x equals 0 then x+z.s else z.r.

As shown in FIG. 5, the pattern matching technique can also be used to described fine-grained dependencies, such as parts of composite values. For example, the pattern symbol 510 indicates that the dependency of the record z will match for any value of the field s of the record.

Fingerprinting

In a practical application, composite values such as records can be very large source code objects. Therefore, cache entries can become quite large. If composite values are stored in the cache as variable length byte strings, then the time required to match the entries can become excessively long. If the look-up time is long, the time saved by not having to evaluate expressions is diminished. Therefore, in a preferred embodiment, a fingerprinting technique can be used to reduce the size of the entries.

A large value can be replaced by its "fingerprint" to reduce the time required to match entries. An exemplary fingerprinting scheme for byte strings, see Some Applications of Rabin's Fingerprinting Method, Sequences II Methods in Communication, Security, and Computer Science, 1993, Springer-Verlag, by Andrei Z. Broder, ed. by Capocelli, et al., can generally be described by the algorithm, $f(A)=A(t) \bmod P(t)$ where A is a byte string to be fingerprinted and may also be considered as the polynomial A(t), A(t) is the polynomial, $A(t)=a_1 t^{m-1}+a_2 t^{m-2}+ \ldots +a_m$, of degree (m-1) with coefficients in the field $\{0,1\}$, and P(t) is an irreducible polynomial of degree k over the field $\{0,1\}$. The fingerprint of the concatenation of two value strings can be computed via the equality: $f(concat(A, B))=f(concat(f(A), f(B))$. Therefore, fingerprints of composite values can be built up piece by piece as the parts of the composite value are determined by the evaluator.

Since the input values to be fingerprinted are theoretically unbounded in size, multiple values may theoretically have an identical fingerprint. However, in actual practice, the probability of collisions is low, since the collision probability grows quadratically with the number of values compared and linearly with the lengths of the value.

Fingerprinting Patterns

Fingerprinting of input patterns can be performed as described using the following example. The application of a function g(a, b) yields a record q=[r=4, s=8], and moreover, the entire result is produced for any expression in the form of g(a, *), where * is the pattern symbol. To generate a corresponding cache entry, take the fingerprint of g, and store with the fingerprint the information that g(a, *) is [r=4, s=8]. Note, the function g itself does not include any wildcard information. Thus, the corresponding cache entry includes the fingerprint of the function g, and information that the result value of g(x, y) is [r=4, s=8] whenever x=a.

Subsequently, if an expression in the general form of g(a', b') is to be evaluated, prior to matching for cache entries, fingerprint the function g. Now, matching the input pattern including the fingerprints of g will cause a cache hit. If further examination of the input pattern and the cache entry reveals that a'=a, then the result is [r=4, s=8]. The examination may also reveal, for example, that the r component of the q record is 4 for any expression in the form of g(*, *). Such information can also be included with the cache entry matching on the fingerprint of g. Fingerprinting reduces the size of the cache entries, and speeds up cache look-up.

FIG. 6 shows cache entries 610 and 620 corresponding to entries 101–102 of FIG. 1 storing fixed length fingerprints instead of explicit values. As shown, fingerprints can be used for values appearing in the expression as well as in the dependency column. It should be apparent that comparing fingerprints can proceed much faster than comparing the many lines of a source code object which the fingerprint represents.

Lazy Evaluation

As stated above, not all parameters of a function will necessarily contribute to the result. Therefore, processing work can be avoided if evaluation is deferred as long as possible, for example, until the value is actually needed. If the value is never needed, the work is not done at all. The same can be said for parts of a composite value, such as a field of a record—the field is not evaluated until it is actually referenced. This "lazy" evaluation is advantageous when the computation of a vale consumes a large amount of time.

For example consider the following program F let $a = 2$ $z = [r = 4, s = -4]$ $f(x, y) =$ if $x$ equals 0 then $y + 1$ else $z.r$ in $f$(factorial$(a)$, factorial$(5*a)$)

An "eager" interpretation would evaluate both parameters of the function $f$ before interpreting the body of the function. Hence, the factorial function is called twice. However, it can be determined that only the result supplied for x, e.g., factorial(a) will be used, since it is non-zero, and the value supplied for y, namely factorial(5*a), is never required. A lazy evaluation proceeds directly with the function body, simplifying the expressions associated with the names as they are encountered during interpretation. In this case, only x is evaluated to yield a non-zero result, and as a consequence y is never evaluated.

Although lazy evaluation reduces the amount of work that needs to be done, it can increase storage requirements when the result is smaller than the unevaluated expression. More importantly, some portion of a current context, e.g., any names defined in the scope in which the unevaluated expression appears, must be stored with the expression so that a consistent result is produced when the expression is ultimately evaluated. Thus, a "lazy" value is effectively a closure without parameters. The lazy value includes an expression and a set of "name=value" associations that define the current context of interpretation for the expression. Using the example program F above, the lazy value for the first parameter of the function is:

<{a=2}, factorial (a)> with the assumption that the interpreter includes a factorial function, otherwise the factorial function would have to be specified with the set of "name=value" associations as shown in the following program section G < {a = 2, factorial = < (n) {}, if n = 1 then 1 else n ∗ factorial (n − 1)} > factorial (a) >

The value associated with the name "factorial," as shown in the example above, is a closure.

Lazy evaluation, in part, enables dynamic fine-grained analysis. An interpreter that evaluates expressions only when they are needed computes, as a side effect, a precise set of names whose values contribute to the final result. This means that if a lazy interpreter only computes the value associated with a name, the value must be needed to continue the interpretation process, and consequently, the name and the associated value must be part of the dependency set. An optimal lazy interpreter does this for the smallest set of names, and therefore an optimal lazy interpreter determines a precise, fine-grained set of dependencies.

The following sections describe the primitive processing rules for a interpreter used to process programs expressed in a functional language. More particularly, the sections explain the rules for manipulating names of expressions and subexpressions in the course of execution of the interpreter. As described above, precise component part of expressions are identified by names so that they may subsequently be recognized. Names can either be labels or access paths. Labels and access paths are presented in the following sections.

In the illustrated graphs, triangles represent trees or sub-trees, circles represent nodes of trees or sub-trees, and the edges of the graph are paths followed to evaluate the component parts of the parse tree representing the program. The downward arrow represents the transformation from the input to the output due to the application of a rule.

Function Apply Rule

Figure 7:
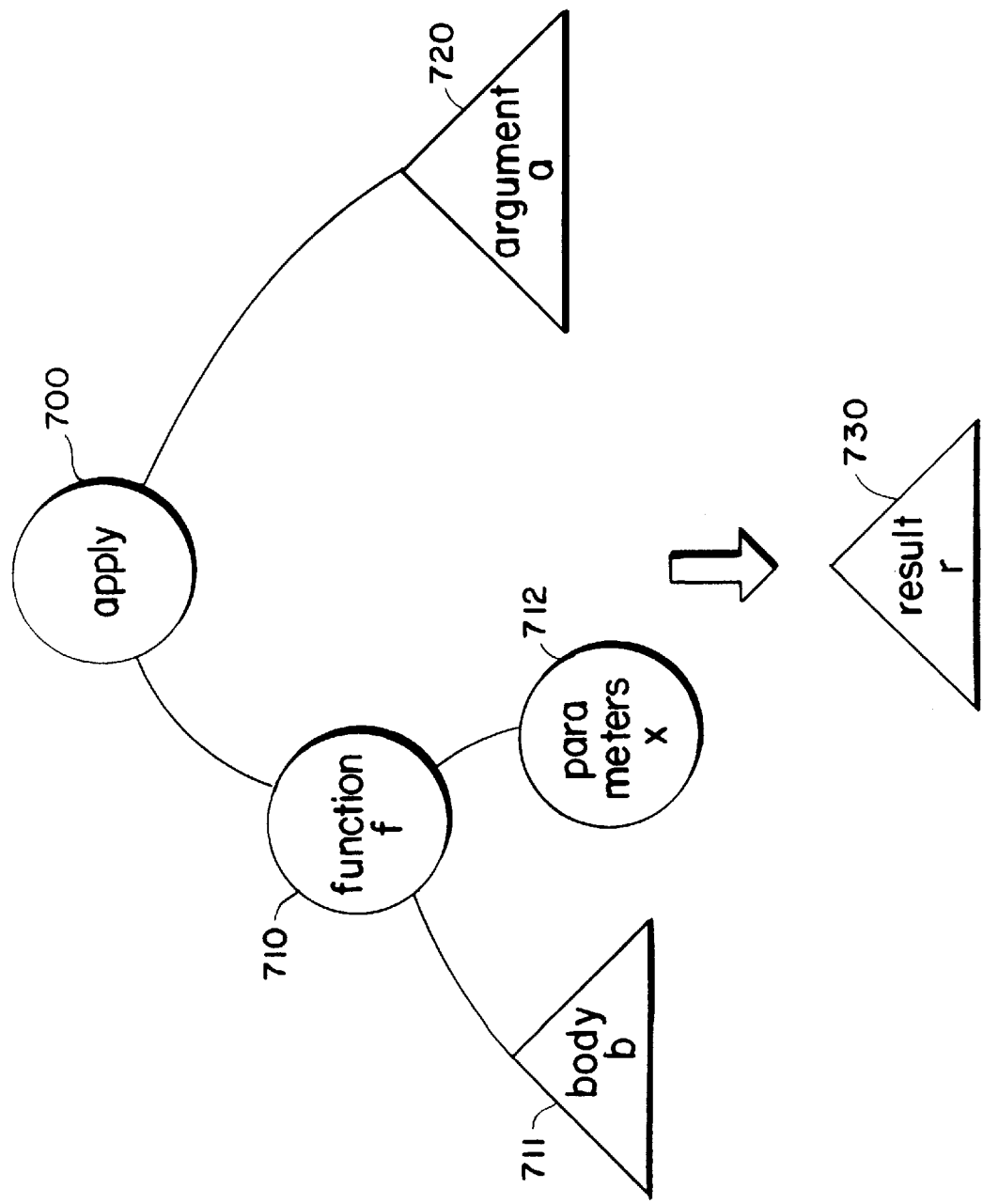
FIG. 7 shows a rule for a function application.

FIG. 7 illustrates a standard rule 700 for applying a function f 710 including a body b 711 using argument a 720 to produce a result r 730. Here, for example, the textual substitution of a for the parameter x to produce r can be implemented using well known functional language processing methodologies expressed in terms of, for example, stacks and closures.

Composite Value Select Rule

Figure 8:
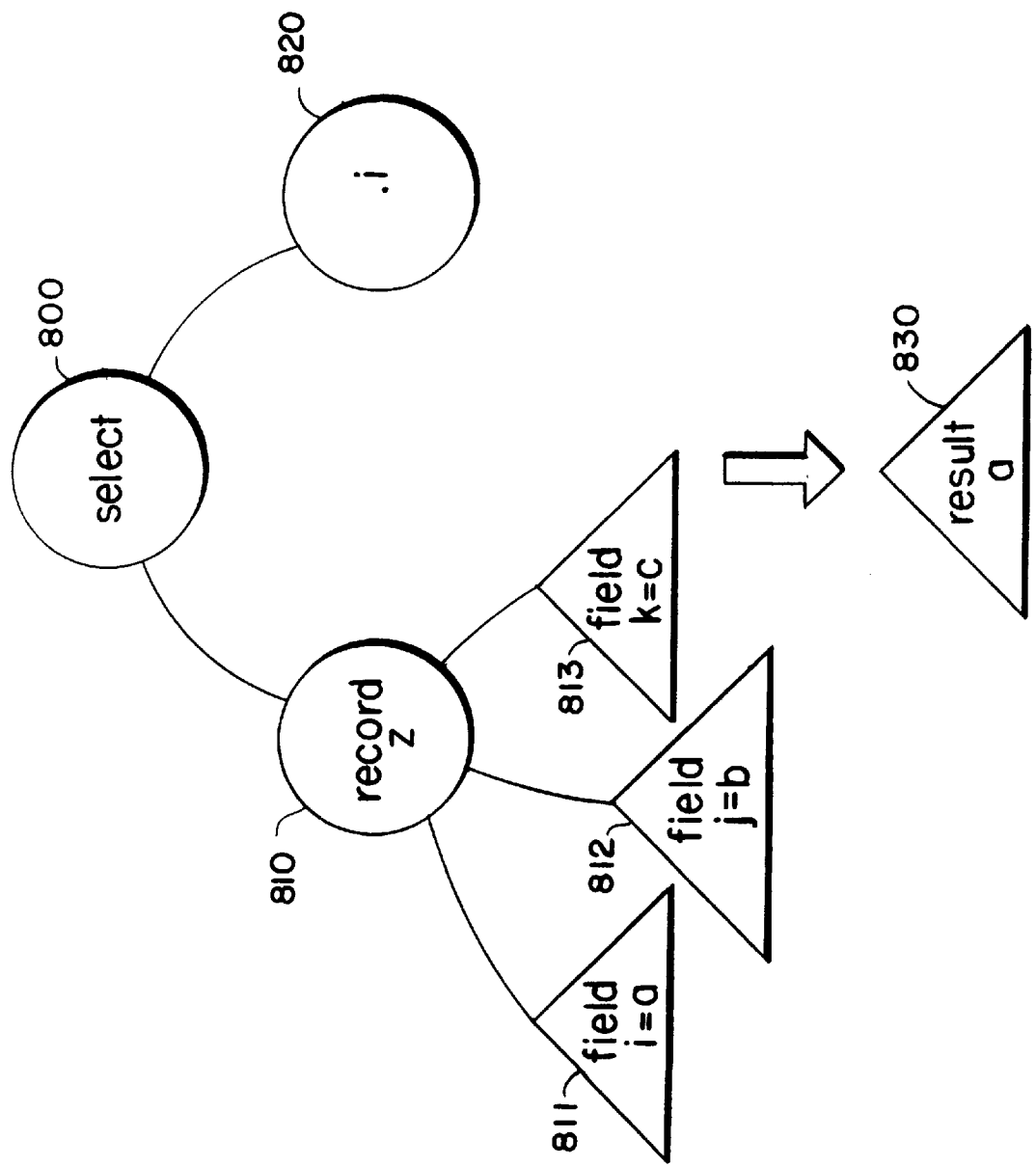
FIG. 8 shows a rule for selecting a component part of a complex value.

FIG. 8 illustrates a standard rule 800 for selecting component parts of a composite value. For example, a record z 810 includes as component parts field 811–813, e.g., z=[i=a, j=b, k=c]. In this case, the selection .i 820 yields as a result a 830.

Manipulating Function Labels

Figure 9:
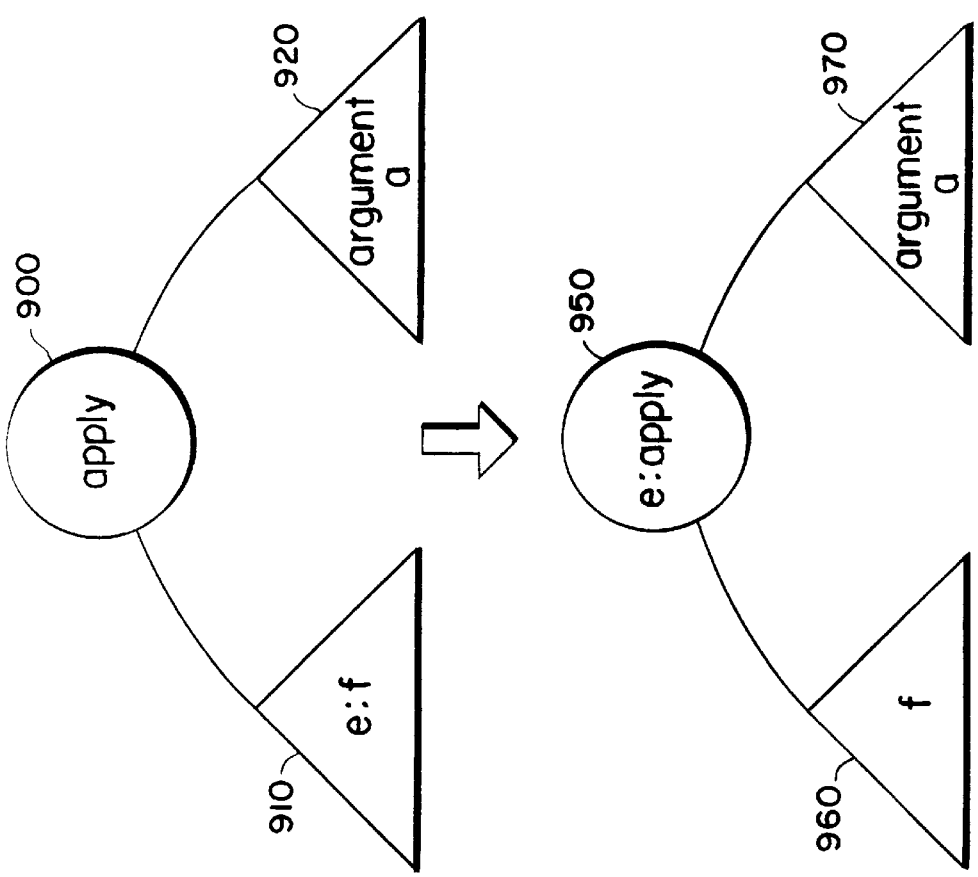
FIG. 9 shows a rule for manipulating names of a function.

Recall from above, the nodes of the parse tree 210 can be named using labels. FIG. 9 illustrates a rule 900 for manipulating names of functions expressed as labels. For example, the node 910 represents the parse tree for the function f. The root of the tree 910 is labeled e. The rule 900 when supplied with an argument a 920 yields a tree including at the root node a function e:apply 950, and the sub-trees of the function f 960, and the argument a 970. Once this tree has been obtained, the standard rule for function application can be invoked to continue the computation.

Manipulating Complex Value Labels

Figure 10:
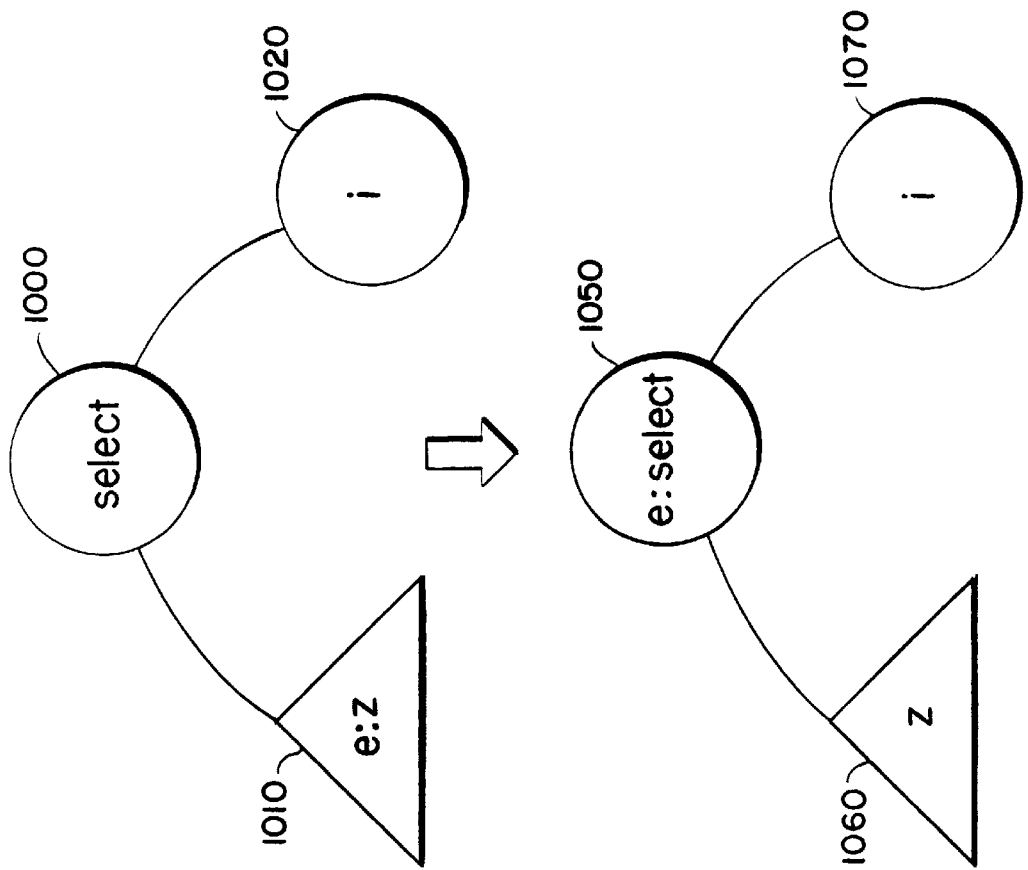
FIG. 10 shows a rule for manipulating names of a composite value.

FIG. 10 shows a rule 1000 for manipulating labels of a composite value. For example, a record z has a label e 1010. The select rule when supplied with the argument i 1020, yields a tree including at the root a function e:select 1050, and as sub-trees the record z 1060, and the node representing argument .i 1070. Once the resultant tree has been obtained, the standard rule for selection can be invoked to continue the computation.

Interleaved Evaluation and Naming

As stated above, the primary purpose of the method steps of the interpretative process is to produce an output O for a given input I. Secondarily, portions of the input and output may be named with labels or path to facilitate precise caching as disclosed herein. Therefore, the method steps of the interpreter must also manipulate the names. In the interpreter using fine-grained dependency analysis, these steps are interleaved. In fact, the steps can happen in any order, yielding always the same final result. In the terminology of lambda calculus, this is called the confluence property.

The methodology used for producing the output can be traditional. In particular, during evaluation of the parse tree, f is a function that maps any input x, taking into consideration the application of the function f onto a body b, to yield an output r, see FIG. 7. The selection of component parts of a complex value can also be handled with traditional methods, see FIG. 8.

The technique for manipulating labels of functions and complex values is non-traditional. More particularly, if there is an application of a function f, as shown in FIG. 9, and if the function f has a label (e), then the label is moved to the top of the function application, see FIG. 9. Analogous rules are possible for composite values such as records as shown in FIG. 10.

Reflecting Labels in Cache Entries

Figure 11:
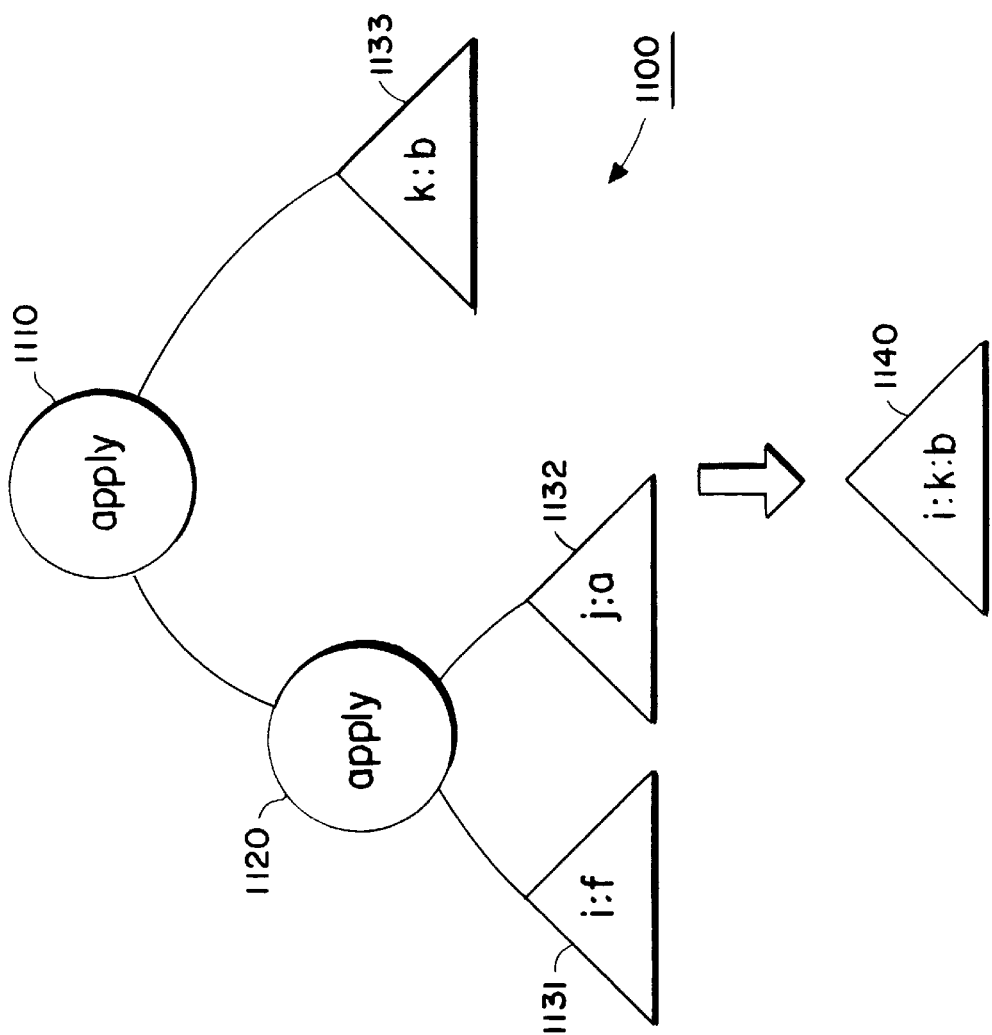
FIG. 11 shows a label manipulation for function application.

FIG. 11 shows a parse tree 1100 including nodes representing apply rules 1110 and 1120, and labeled sub-tree i:f, j:a, and k:b 1131–1133. Applying the rules to the input patters yields a tree 1140 having labels i and k, e.g., node 1140. Since the label j does not appear anywhere in the output, for the purpose of caching, the input pattern may just as well be replaced by a tree 1200 as shown in FIG. 12.

Figure 12:
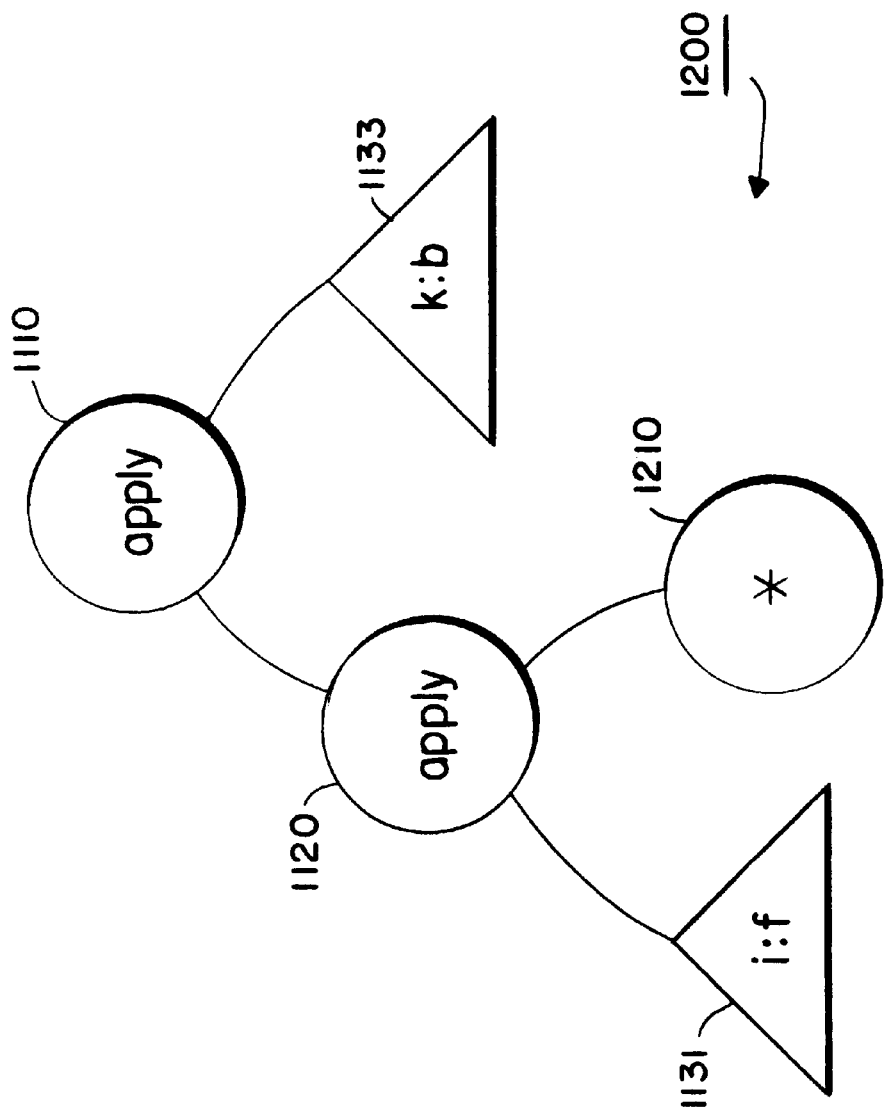
FIG. 12 shows a function application with wildcard dependency information.

In FIG. 12, the node 1132 of FIG. 11 has been replaced by a node 1210 representing the wildcard symbol "*." The labels, which are represented explicitly in the Figures, are one way for naming the "precise" parts of the input to an evaluation.

In general, the result of an evaluation will only contain labels of the labelled parts of the input that contribute to producing the result. Therefore, any other parts of the input can be replaced with the wildcard symbol "*." In fact, any part of the result of an evaluation will only contain labels of the input that contribute to producing that part of the result.

Names as Paths

Other unambiguous naming conventions, other name labels, can also be used. In another embodiment, the naming can be the access paths to reach any particular node. For example with reference to FIG. 12, the node 1210 can be uniquely identified by the path which begins at the top node 1110, and then follows the left edge to the next node, and from there the right edge to node 1210. However, since paths implicitly identify the node, the path needs to be adjusted as the morphology of the parse tree changes during evaluation.

For fine-grained dependency analysis with paths, names are defined by the paths for accessing the parts of the inputs that contribute to the result. More specifically, only the paths for the parts of the input that contribute to each part of the result are defined. As with the naming technique that uses labels, the determinations are made during the course of evaluation. With each step of the computation (function application, record selection), the parts of the input which contribute to the output are noted. It should be understood that it is not necessary to name every input part. In fact, only the parts that represent input arguments to an evaluation need to be labeled.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

What is claimed is:

1. A method of executing a computer program represented in a functional language, the method comprising the steps of:
   expressing the program in a first memory as input values and functions operating thereon to produce result values;
   interpreting the program in a processor connected to the first memory and a second memory to produce result values from at least some of the input values;
   performing a fine-grained dependency analysis by identifying, based on the interpreting step, result values that depend on any of the input values, at least some of the dependencies not being capable of identification prior to the interpretation step;
   for each identified dependency, naming the input value and any portion of the function necessary to produce the result value; and
   recording in the second memory, for each identified dependency,
      the named function or portion thereof;
      the input values on which the function depends; and
      the result value produced by the function during interpretation.

2. The method of claim 1 wherein the naming step comprises assigning a unique label to each item named.

3. The method of claim 1 wherein the naming step comprises assigning, to each item named, a unique path required to access said item.

4. The method of claim 1 wherein the second memory is a cache and further comprising the steps of:
   prior to interpreting a particular function, determining if the function is stored in the second memory, and if the function is stored in the memory, then
   determining if current input values for the particular function match the values of the particular function stored in the second memory, and if the values match, then
   immediately assigning the stored result value to the particular function.

5. The method of claim 4 wherein, for at least some of the interpreted functions, the functions are converted to a pattern derived therefrom and the function is stored in the second memory as the pattern, and further wherein the determination step is accomplished by matching any component of the particular function which corresponds to the pattern.

6. The method of claim 1 further comprising:
   deferring interpretation of a particular input value until the particular input value is required by a particular function.

7. The method of claim 1 further comprising the steps of:
   converting the function which is being interpreted to a first fingerprint, and storing the fingerprint in the second memory;
   prior to interpreting the particular function, converting the particular function to a second fingerprint, and
   comparing the first and second fingerprint to determine if the second memory stores the values associated with the particular function.

8. The method of claim 1 wherein the program represents a model for a software system, the interpreting step building the software system.

9. The method of claim 8 wherein the model includes source code objects, compilation functions, and build options.

10. The method of claim 1 wherein some of the input values are complex values having a plurality of component values.

\* \* \* \* \*